O. H. BARTHOLOMEW.
BLOW-OUT PATCH.
APPLICATION FILED JUNE 30, 1920.
1,370,778.
Patented Mar. 8, 1921.
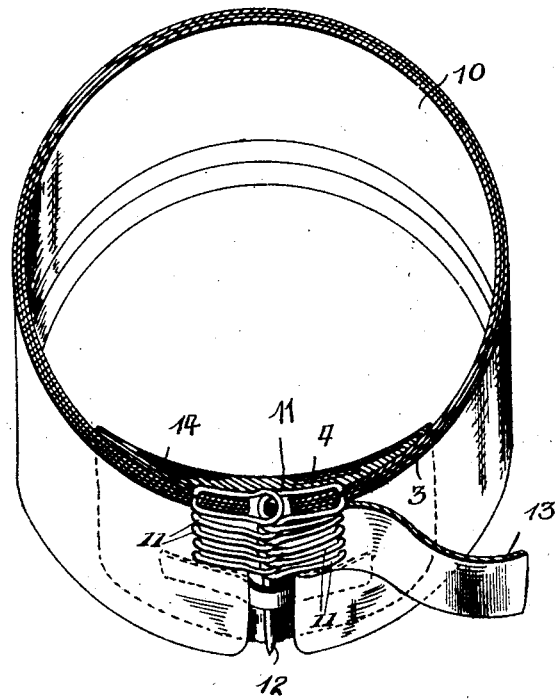
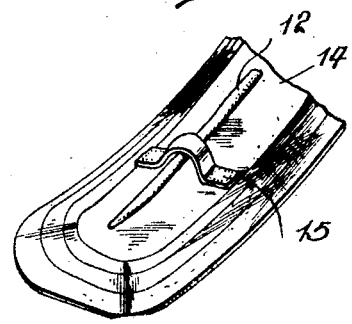
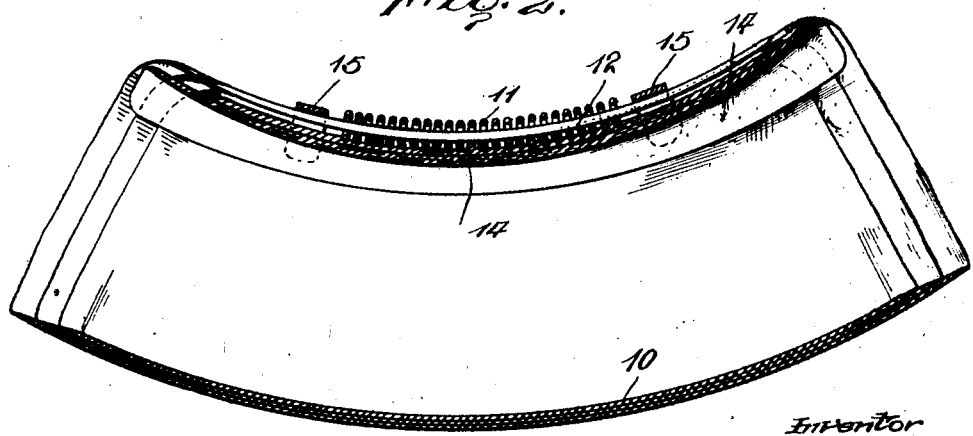
Inventor
O. H. Bartholomew

UNITED STATES PATENT OFFICE.

OHMER H. BARTHOLOMEW, OF PEORIA, ILLINOIS.

BLOW-OUT PATCH.

1,370,778.  Specification of Letters Patent.  Patented Mar. 8, 1921.

Application filed June 30, 1920. Serial No. 393,043.

*To all whom it may concern:*

Be it known that I, OHMER H. BARTHOLOMEW, citizen of the United States, residing at Peoria, in the county of Peoria and State of Illinois, have invented certain new and useful Improvements in Blow-Out Patches, of which the following is a specification.

This invention relates to an improved blow out patch for pneumatic tires and has as one of its principal objects to provide a patch which will relieve the tire casing adjacent the blow out therein of all the bulging stress of the inner tube.

The invention has as a further object to provide a patch so constructed that chafing or pinching of the inner tube thereby will be prevented.

A still further object of the invention in this connection is to provide a patch employing a liner to overlie the joint between the sides of the patch body for presenting a smooth surface to the inner tube at the joint and wherein said liner will be secured in place by the same means employed for securing the sides of the patch body together.

And the invention has as a still further object to provide a blow out patch which may be readily used in connection with substantially any conventional type of pneumatic tire.

Other and incidental objects will appear hereinafter.

In the drawings:

Figure 1 is a transverse sectional view taken medially through my improved blow out patch, Fig. 2 is a longitudinal sectional view more particularly illustrating the mounting of the liner within the patch body, and Fig. 3 is a fragmentary perspective view showing one end portion of the liner.

In carrying the invention into effect, I employ a patch body 10. This patch body may be constructed of canvas or any other approved material and is preferably laminated, the end portions of the patch body being feathered or skived so as to lie close against the inner face of a tire casing. As particularly brought out in Fig. 1 of the drawings, the patch body is split longitudinally and secured to the sides of the patch body is a plurality of mating staples or loops 11 through which is removably received a tie member or thong 12 connecting said sides. Thus, when the patch body is arranged within a tire casing, the patch body will sustain all of the bulging stress of an inner tube extending through the patch body. Secured by the series of staples upon one of the sides of the patch body is a flap 13 adapted for engagement beneath the bead of a tire casing for holding the patch body against creeping.

In connection with the patch body I employ a liner 14. This liner, like the patch body, may be also formed of canvas or other approved material and is of a length substantially equal to the length of the patch body. At its side margins as well as at its ends, the outer face of the liner is skived or feathered so as to seat flat against the inner face of the patch body and, as will be observed upon particular reference to Fig. 1, the liner is arranged to overlie the joint between the sides of the patch body. Consequently, this liner will prevent an inner tube from coming in contact with the longitudinal edges of the sides of the patch body or in contact with the staples 11, so that pinching or chafing of the inner tube will thus be prevented. Secured to the end portions of the liner upon the outer side thereof, are loops 15. These loops are arranged to project between the longitudinal edges of the sides of the patch body and freely receive the end portions of the throng 12. Thus, this thong will, in addition to serving as a connection between the sides of the patch body, also serve to secure the liner in position. As will be observed upon reference to Fig. 2, the loops will confront opposite ends of the mating series of staples and will thus be disposed to coact with the terminal staples of said series for preventing longitudinal movement of the liner. The liner will thus be securely held in place. In this connection it will be observed that the end portions of the sides of the patch body are free, the series of staples not extending the full length of the longitudinal edges of the sides of the patch body. Consequently, the end portions of the patch body will be permitted to bulge against the inner tube under stress of an inner tube extending through the patch body so that close and tight-fitting joints between the ends of the patch body and the ends of the casing will be maintained. For a similar reason, the end portions of the liner are left free. It will accordingly be seen that I provide a particularly effective type of blow out patch and a patch which may be readily used in connection with substantially any conventional type of pneumatic tire.

Having thus described the invention, what is claimed as new is:

1. A blow out patch including a split patch body, means connecting the sides of the patch body, and a liner within the patch body overlying the joint between the sides thereof and secured by said means.

2. A blow out patch including a split patch body, means tying the sides of the patch body together, a liner arranged within the patch body to overlie the joint between the sides thereof, and means carried by the liner to coact with said first mentioned means whereby the liner is secured in position.

3. A blow out patch including a split patch body, means tying the sides of the patch body together, a liner arranged within the patch body to overlie the joint between the sides thereof, and loops carried by the liner for receiving said means therethrough whereby the liner is secured in position.

4. A blow out patch including a split patch body, a thong tying the sides of the patch body together, a liner arranged within the patch body to overlie the joint between the sides thereof, and means carried by the liner to coact with said thong whereby the liner is secured in position.

5. A blow out patch including a split patch body, a thong tying the sides of the patch body together, a liner arranged within the patch body to overlie the joint between the sides thereof, and loops carried by the liner and receiving the thong therethrough whereby the liner is secured in position.

In testimony whereof I affix my signature.

OHMER H. BARTHOLOMEW. [L. S.]